(12) United States Patent
Lee et al.

(10) Patent No.: US 11,785,427 B2
(45) Date of Patent: Oct. 10, 2023

(54) CONTROL PLANE-BASED COMMUNICATION OF MULTIMEDIA BROADCAST/MULTICAST SERVICE SERVICE KEYS

(71) Applicant: QUALCOMM Incorporated, San Diego, CA (US)

(72) Inventors: Soo Bum Lee, San Diego, CA (US); Adrian Edward Escott, Reading (GB); Anand Palanigounder, San Diego, CA (US); Hongil Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/653,022

(22) Filed: Mar. 1, 2022

(65) Prior Publication Data
US 2023/0117327 A1  Apr. 20, 2023

Related U.S. Application Data

(60) Provisional application No. 63/262,781, filed on Oct. 20, 2021.

(51) Int. Cl.
*H04W 4/00* (2018.01)
*H04W 4/08* (2009.01)
(Continued)

(52) U.S. Cl.
CPC ............. *H04W 4/08* (2013.01); *H04W 12/03* (2021.01); *H04W 12/041* (2021.01); *H04W 12/0431* (2021.01)

(58) Field of Classification Search
CPC ........... H04J 2203/0069; H04W 72/04; H04W 72/12; H04W 4/06; H04W 12/041; H04W 12/0431
See application file for complete search history.

(56) References Cited

U.S. PATENT DOCUMENTS 10,750,366 B1 *  8/2020  Gundavelli ......... H04W 12/069
2004/0180681 A1 *  9/2004  Jeong .................... H04L 1/1671
455/503

(Continued)

OTHER PUBLICATIONS

"3rd Generation Partnership Project, Technical Specification Group Services and System Aspects, 3G Security, Security of Multimedia Broadcast/Multicast Service (MBMS) (Release 16)", 3GPP Standard, Technical Specification, 3GPP TS 33.246, 3rd Generation Partnership Project, Mobile Competence Centre, 650, Route Des Lucioles, F-06921 Sophia-Antipolis Cedex, France, vol. SA WG3, No. V16.0.0 Jul. 10, 2020, XP051924921, pp. 1-75, Section 6.3.2.1 and 6.3.3.1.

(Continued)

*Primary Examiner* — Shantell L Heiber
(74) *Attorney, Agent, or Firm* — Harrity & Harrity, LLP

(57) ABSTRACT

Various aspects of the present disclosure generally relate to wireless communication. In some aspects, a user equipment (UE) may register to a cellular network associated with a multicast/broadcast multimedia service (MBMS). The UE may transmit, to the cellular network, a request to join the MBMS. The UE may receive, from the cellular network and based at least in part on being registered with the cellular network, a response that indicates an MBMS service key (MSK) and MSK identifier pair. Numerous other aspects are described.

28 Claims, 10 Drawing Sheets

(51) Int. Cl.
*H04W 12/03* (2021.01)
*H04W 12/041* (2021.01)
*H04W 12/0431* (2021.01)

(56) References Cited

U.S. PATENT DOCUMENTS

| | | | | |
|---|---|---|---|---|
| 2005/0157876 | A1* | 7/2005 | Jeong | H04W 12/03 348/E7.056 |
| 2008/0009274 | A1* | 1/2008 | Zhu | H04L 63/062 455/414.2 |
| 2011/0055565 | A1* | 3/2011 | Murakami | H04L 63/061 713/168 |
| 2012/0102315 | A1* | 4/2012 | Holtmanns | H04L 63/06 713/150 |
| 2012/0202493 | A1* | 8/2012 | Wang | H04W 60/00 455/435.1 |
| 2013/0294603 | A1* | 11/2013 | Lehtovirta | H04W 12/041 380/270 |
| 2014/0082360 | A1* | 3/2014 | Laitinen | H04L 63/061 713/168 |
| 2015/0119023 | A1* | 4/2015 | Wang | H04W 12/041 455/432.1 |
| 2015/0208209 | A1* | 7/2015 | Jamadagni | H04L 67/568 370/312 |
| 2015/0215918 | A1* | 7/2015 | Wu | H04W 24/10 370/329 |
| 2018/0146362 | A1* | 5/2018 | Hou | H04W 72/30 |
| 2019/0223063 | A1* | 7/2019 | Palanigounder | H04W 12/041 |
| 2020/0329397 | A1* | 10/2020 | Huang-Fu | H04W 80/10 |
| 2021/0144516 | A1* | 5/2021 | Kim | H04W 72/02 |
| 2021/0345165 | A1* | 11/2021 | Naik | H04W 28/08 |
| 2022/0045806 | A1* | 2/2022 | Cirik | H04L 1/1887 |
| 2022/0053455 | A1* | 2/2022 | Baek | H04W 72/005 |

OTHER PUBLICATIONS

International Search Report and Written Opinion—PCT/US2022/042227—ISA/EPO—dated Nov. 29, 2022.
Philips International B.V., "Update in Solution#9", 3GPP TSG-SA3 Meeting #104e-Ad-hoc, S3-213542, 3rd Generation Partnership Project, Mobile Competence Centre, 650, Route Des Lucioles, F-06921 Sophia-Antipolis Cedex, France, vol. SA WG3, No. e-meeting, Sep. 27, 2021-Sep. 30, 2021 Sep. 20, 2021, XP052062995, 10 Pages, Section 6.9.
Philips International B.V., "Update Solution 11 for Reduced Key Update Overhead", 3GPP TSG-SA3 Meeting #104-e, S3-212765, 3rd Generation Partnership Project, Mobile Competence Centre, 650, Route Des Lucioles, F-06921 Sophia-Antipolis Cedex, France, vol. SA WG3, No. e-meeting, Aug. 16, 2021-Aug. 27, 2021 Aug. 9, 2021, XP052063416, 4 Pages, Section 6.11.
Zte: "Update the Solution #12", 3GPP TSG-SA3 Meeting #104-e, S3-212555 (Revision of S3-20xxxx), 3rd Generation Partnership Project, Mobile Competence Centre, 650, Route Des Lucioles, F-06921 Sophia-Antipolis Cedex, France, vol. SA WG3, No. e-meeting, Aug. 16, 2021-Aug. 27, 2021 Aug. 9, 2021, XP052063212, 3 Pages, Section 6.12.

* cited by examiner

CONTROL PLANE-BASED COMMUNICATION OF MULTIMEDIA BROADCAST/MULTICAST SERVICE SERVICE KEYS

CROSS-REFERENCE TO RELATED APPLICATION

This Patent Application claims priority to U.S. Provisional Patent Application No. 63/262,781, filed on Oct. 20, 2021, entitled "CONTROL PLANE-BASED COMMUNICATION OF MULTIMEDIA BROADCAST/MULTICAST SERVICE SERVICE KEYS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for control plane-based communication of multimedia broadcast/multicast service service keys.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include registering to a cellular network associated with a multicast/broadcast service. The method may include transmitting, to the cellular network, a request to join the multimedia broadcast/multicast service (MBMS). The method may include receiving, from the cellular network and based at least in part on being registered with the cellular network, a response that indicates an MBMS service key (MSK) and MSK identifier pair.

Some aspects described herein relate to a method of wireless communication performed by a network entity. The method may include receiving, from a UE and via a cellular network, a request to join the MBMS. The method may include transmitting an MSK to the UE via a control plane of the cellular network based at least in part on the UE being registered with the cellular network.

Some aspects described herein relate to a UE for wireless communication. The user equipment may include a memory and one or more processors coupled to the memory. The one or more processors may be configured to register to a cellular network associated with a multicast/broadcast service. The one or more processors may be configured to transmit, to the cellular network, a request to join the MBMS. The one or more processors may be configured to receive, from the cellular network and based at least in part on being registered with the cellular network, a response that indicates an MSK and MSK identifier pair.

Some aspects described herein relate to a network entity for wireless communication. The network entity may include a memory and one or more processors coupled to the memory. The one or more processors may be configured to receive, from a UE and via a cellular network, a request to join the MBMS. The one or more processors may be configured to transmit a MSK to the UE via a control plane of the cellular network based at least in part on the UE being registered with the cellular network.

Some aspects described herein relate to a non-transitory computer-readable medium that stores a set of instructions for wireless communication by a UE. The set of instructions, when executed by one or more processors of the UE, may cause the UE to register to a cellular network associated with a multicast/broadcast service. The set of instructions, when executed by one or more processors of the UE, may cause the UE to transmit, to the cellular network, a request to join the MBMS. The set of instructions, when executed by one or more processors of the UE, may cause the UE to receive, from the cellular network and based at least in part on being registered with the cellular network, a response that indicates an MSK and MSK identifier pair.

Some aspects described herein relate to a non-transitory computer-readable medium that stores a set of instructions for wireless communication by a network entity. The set of instructions, when executed by one or more processors of the network entity, may cause the network entity to receive, from a UE and via a cellular network, a request to join the MBMS. The set of instructions, when executed by one or more processors of the network entity, may cause the network entity to transmit a MSK to the UE via a control plane of the cellular network based at least in part on the UE being registered with the cellular network.

Some aspects described herein relate to an apparatus for wireless communication. The apparatus may include means for registering to a cellular network associated with a multicast/broadcast service. The apparatus may include means for transmitting, to the cellular network, a request to join the MBMS. The apparatus may include means for receiving, from the cellular network and based at least in part on being registered with the cellular network, a response that indicates an MSK and MSK identifier pair.

Some aspects described herein relate to an apparatus for wireless communication. The apparatus may include means for receiving, from a UE and via a cellular network, a request to join the MBMS. The apparatus may include means for transmitting a MSK to the UE via a control plane of the cellular network based at least in part on the UE being registered with the cellular network.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
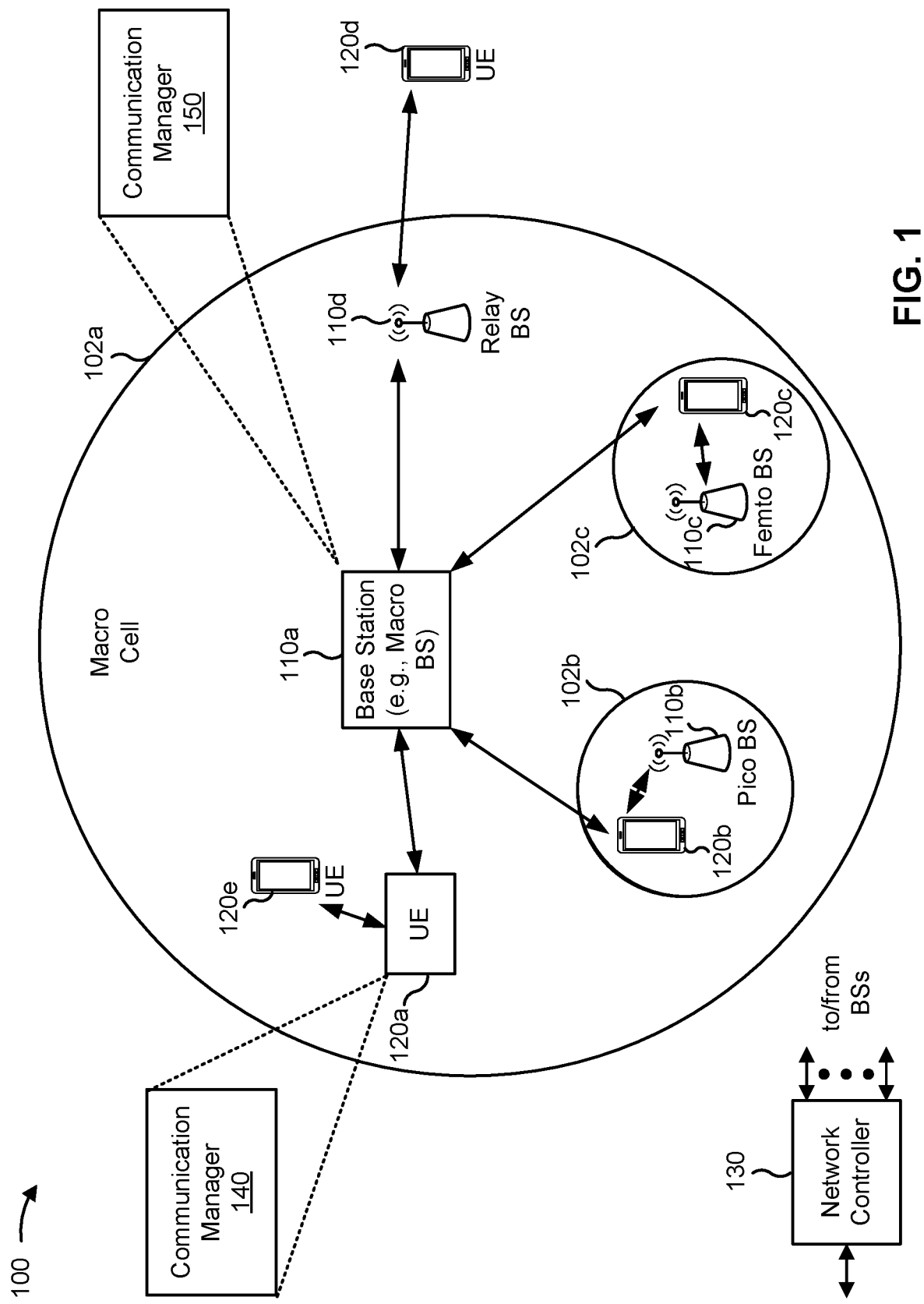
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may register to a cellular network associated with a multimedia broadcast/multicast service (MBMS) transmit, to the cellular network, a request to join the MBMS; and receive, from the cellular network and based at least in part on being registered with the cellular network, a response that indicates an MSK and MSK identifier pair. The response may indicate one or more MSK and MSK identifier pairs. Different MSK and MSK identifier pairs may have different validity times. Additionally, or alternatively, the communication manager 140 may perform one or more other operations described herein.

In some aspects, the base station 110 may include a communication manager 150. As described in more detail elsewhere herein, the communication manager 150 may receive, from a UE, a request to join the MBMS; forward the request to join the MBMS service to a network entity; receive a MSK from the network entity; and transmit an MSK to the UE via a control plane of a cellular network associated with the base station based at least in part on the UE being registered with the cellular network. Additionally, or alternatively, the communication manager 150 may perform one or more other operations described herein.

In some aspects, the term "base station" (e.g., the base station 110), cellular network device, "network node," or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
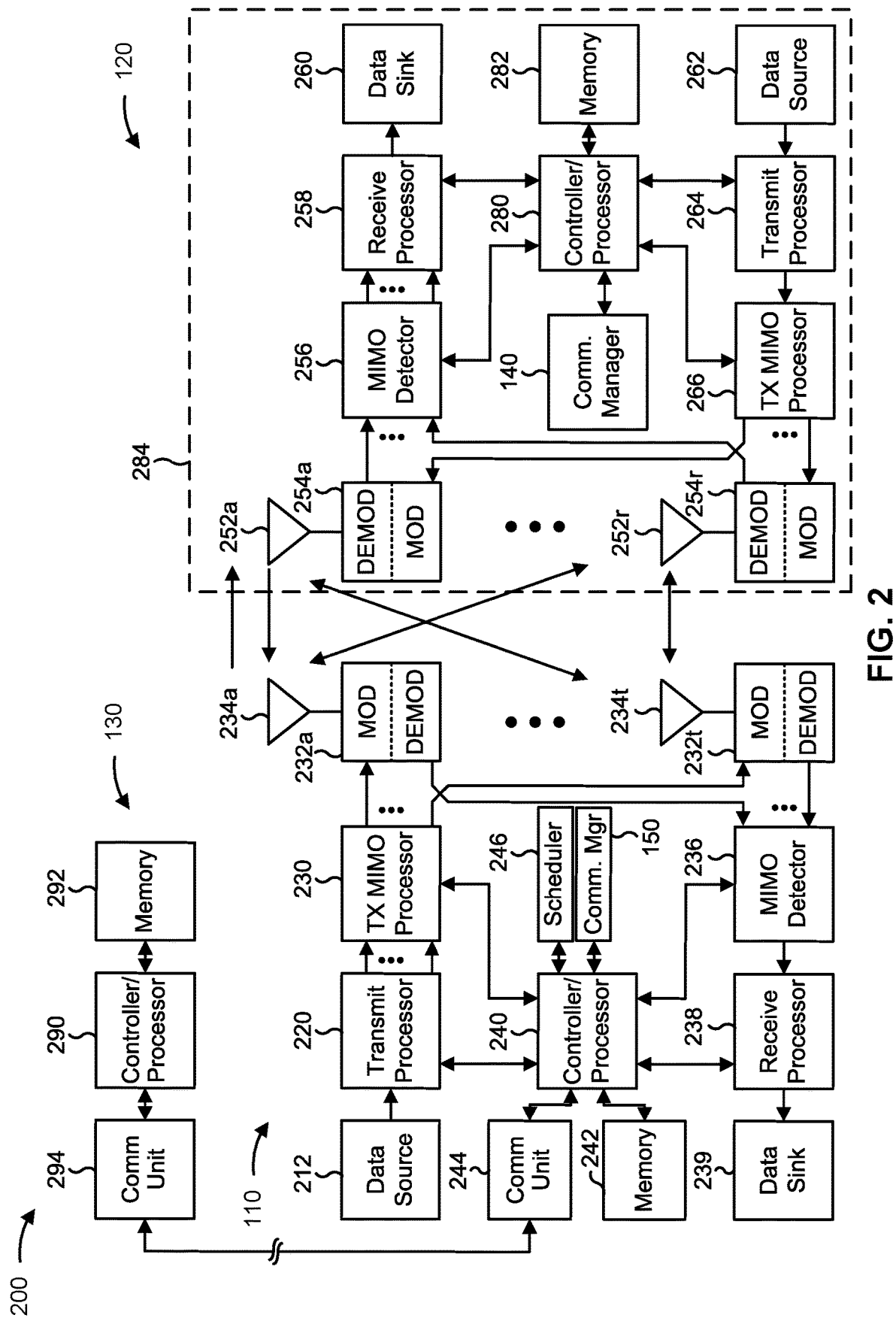
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs)

for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with control plane-based communication of MSKs, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for registering to a cellular network associated with an MBMS means for transmitting, to the cellular network, a request to join the MBMS; and/or means for receiving, from the cellular network and based at least in part on being registered with the cellular network, a response that indicates an MSK and MSK identifier pair. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for receiving, from a UE and via a cellular network, a request to join the MBMS; and/or means for transmitting a MSK to the UE via a control plane of the cellular network based at least in part on the UE being registered with the cellular network. In some aspects, the means for the network entity to perform operations described herein may include, for example, one or more of components shown in FIG. 10, such as processor 1020 memory 1030, input component 1040, output component 1050, and/or communication component, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
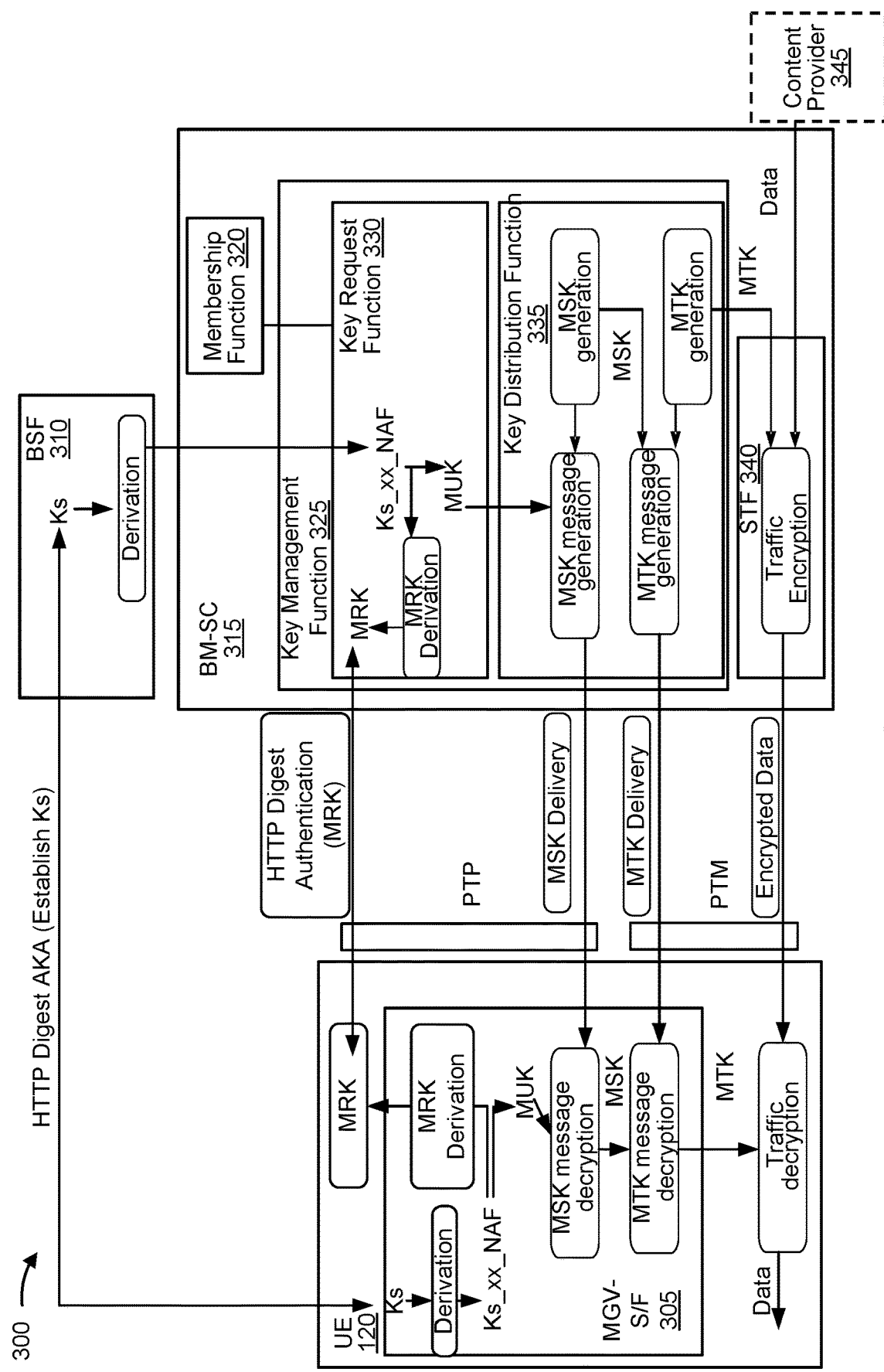
FIG. 3 is a diagram illustrating an example of delivery of a multimedia broadcast/multicast service (MBMS) service key (MSK), in accordance with the present disclosure.

FIG. 3 gives an example 300 of the network elements involved in MBMS from a security perspective. Nearly all the security functionality for MBMS, except for the normal network bearer security, resides in either the broadcast/multicast service center (BM-SC) 315 or the UE 120. The UE may include an MBMS key generation and validation function/storage (MGV-S/F) 305 configured to manage security keys for MBMS communications. The Bootstrapping Server Function (BSF) 310 is a part of generic bootstrapping architecture (GBA). The UE 120 and the BM-SC 315 use the GBA to establish shared keys that are used to protect point-to-point communication between the UE 120 and the BM-SC 315. One or more functions described in connection with FIG. 3 include hardware and/or a combination of hardware and software. The hardware may be included in a server, a base station, and/or another network device.

The BM-SC 315 is a source for MBMS data. Additionally, or alternatively, the BM-SC 315 may be responsible for scheduling data and receiving data from third parties (e.g., the content provider 345) for transmission. The BM-SC 315 is responsible for establishing shared secrets with the UE 120 using the GBA, authenticating the UE 120 with a hypertext transfer protocol (HTTP) digest authentication mechanism, registering and de-registering UEs 120 for MBMS user services, generating and distributing keys necessary for MBMS security to the UEs 120 with multimedia internet keying (MIKEY) protocol and for applying appropriate protection to data that is transmitted as part of an MBMS user service. The BM-SC 315 also provides MBMS bearer authorization for UEs 120 attempting to establish an MBMS bearer.

The BM-SC 315 also verifies whether a UE 120 is authorized to register and receive keys for the MBMS user service. For MBMS multicast mode, this authorization may be performed with use of a membership function 320 or associated with the BM-SC 315. For an MBMS broadcast mode, this authorization may be performed without use of the membership function 320 based at least in part on the membership function 320 only being defined in context of MBMS multicast mode.

The UE 120 may be responsible for establishing shared secrets with the BM-SC 315 using the GBA, registering to and de-registering from MBMS user services, requesting and receiving keys for the MBMS user service from the BM-SC 315 and also using those keys to decrypt MBMS data that is received.

The BM-SC 315 may include sub-functions related to MBMS security. For example, the BM-SC 315 may include a key management function 325. The key management function 325 includes two sub-functions: a key request function 330 and key distribution function 335. The key request function 330 is responsible for retrieving GBA keys from the BSF, deriving an MBMS user key and/or MBMS request key from GBA keys, performing MBMS user service registration, deregistration and MSK request procedures and related user authentication using MBMS request key (MRK), providing MBMS user key (MUK) to a key distribution function 335, and/or performing an authorization check. The key request function 330 may implement the following functions and procedures: bootstrapping initiation, bootstrapping re-negotiation, HTTP digest authentication, MRK derivation, MBMS user service registration procedure, MBMS user service deregistration procedure, and/or a MSK request procedure, among other examples.

The key distribution function 335 is responsible for retrieving MUK from the key request function 330 and/or a registration function, generating and distributing MSKs and MBMS traffic keys (MTKs to the UE, and/or providing MTK to Session and Transmission function 340, among other examples). The key distribution function 335 implements the following security procedures: MSK delivery procedure, MTK delivery procedure, and/or BM-SC solicited pull procedure, among other examples.

The session and transmission function 340 is responsible for session and transmission functions. As part of these session and transmission functions, the session and transmission function 340 performs protection of data with MTK (encryption and/or integrity protection). The session and transmission function 340 implements the following security procedures: protection of streaming data and/or protection of download data.

The membership function 320 is used to verify if a user is authorized to register, receive keys, or to establish an MBMS bearer for MBMS multicast mode. The Membership function may be defined only for MBMS multicast mode.

As indicated above, FIG. 3 is provided as an example. Other examples may differ from what is described with regard to FIG. 3.

Figure 4:
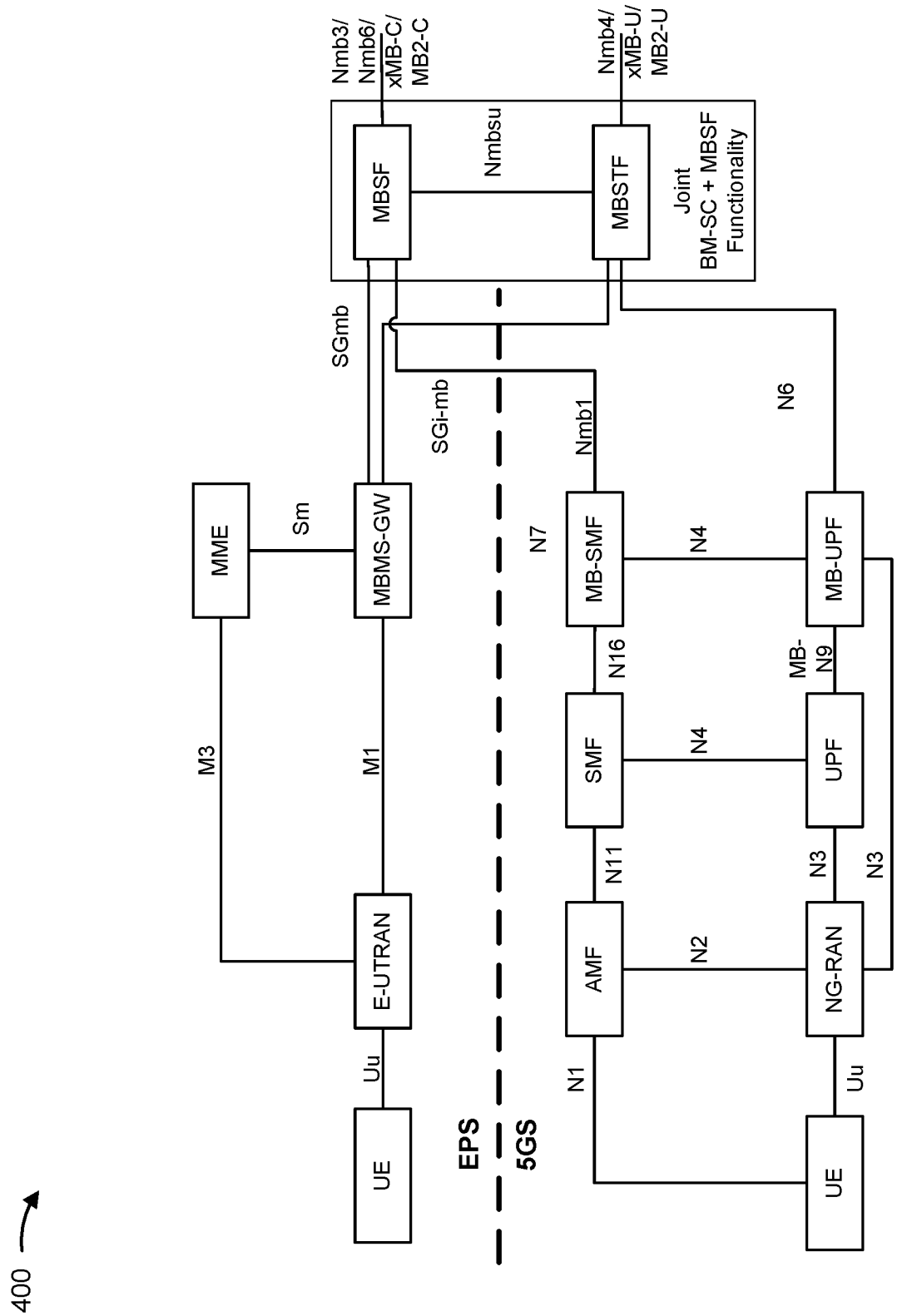
FIG. 4 is a diagram illustrating an example associated with network architectures, in accordance with the present disclosure.

FIG. 4 is a diagram illustrating an example 400 associated with network architectures, in accordance with the present disclosure.

The network architecture includes multiple functions and/or entities. One or more functions and/or entities described in connection with FIG. 4 and otherwise herein include hardware and/or a combination of hardware and software. The hardware may be included in a server, a base station, and/or another network device.

A policy control function (PCF) performs functions to support Multicast and Broadcast Services (MBS) if dynamic Policy and Control Charging (PCC) for MBS is needed. For example, the PCF may support QoS handling for an MBS Session, provide policy information regarding the MBS session to multicast/broadcast Session Management Function (MB-SMF) for authorizing the related QoS profile, interact with User Data Repository (UDR) for QoS information retrieval, and/or receive MBS information from Application Function (AF), Network Exposure Function (NEF) or Multicast/Broadcast Service Function (MBSF), based at least in part on, for example, different configuration options.

An MB-SMF also performs the functions to support MBS. For example, the MB-SMF may support MBS session management (including QoS control), configure Multicast/Broadcast user plane function (MB-UPF) for multicast and broadcast flows transport based on the policy rules for multicast and broadcast services from PCF or local policy, allocate and de-allocate temporary mobile group identities (TMGIs), among other examples. Additionally, or alternatively, the MB-SMF may, for broadcast sessions, interact with a RAN (via Access and Mobility Management Function (AMF)) to control data transport using a 5GC shared MBS traffic delivery method. Additionally, or alternatively, the MB-SMF may, for multicast sessions, interact with a Session Management Function (SMF) to modify a Protocol Data Unit (PDU) Session associated with an MBS session, interact with a RAN (via AMF and SMF) to establish data transmission resources between MB-UPF and RAN nodes for a 5GC Shared MBS traffic delivery method, and/or control multicast data transport using a 5GC Individual MBS traffic delivery method, among other examples.

An SMF may also perform functions to support MBS. For example, the SMF may discover MB-SMF for a multicast session, authorize multicast session join operation if needed, interact with MB-SMF to obtain and manage multicast session context, and/or interact with RAN for shared data transmission resource establishment, among other examples. In some networks, the SMF and MB-SMF may be co-located or deployed separately.

The MB-UPF may also perform functions to support MBS. For example the MB-UPF may, multicast and broadcast sessions, perform packet filtering of incoming downlink packets for multicast and broadcast flows, enforce QoS (MFBR) and counting/reporting based on existing means, interact with MB-SMF for receiving multicast and broadcast data, deliver multicast and broadcast data to RAN nodes for 5GC Shared MBS traffic delivery method, among other examples. Additionally, or alternatively, for multicast sessions, the MB-UPF may deliver multicast data to user plane function (UPF) for 5GC Individual MBS traffic delivery method.

The UPF may also perform functions to support MBS. For example, the UPF may interact with SMF for receiving multicast data from MB-UPF for 5GC Individual MBS traffic delivery method, deliver multicast data to UEs via a PDU session for a 5GC individual MBS traffic delivery method. The UPF and MB-UPF may be co-located or deployed separately.

The AMF may also perform functions to support MBS. For example, the AMF may signal with an NG-RAN and an MB-SMF for MBS session management, select NG-RANs for notification of multicast session activation toward UEs in a CM-IDLE state, select NG-RANs for broadcast traffic distribution, and/or the AMF may be aware of NG-RAN 5G MBS capability.

The NG-RAN may also perform functions to support MBS. For example, the NG-RAN may manage MBS QoS flows via N2, deliver MBS data packets from 5GC shared for multiple UEs over radio using point-to-multipoint (PTM) or point-to-point (PTP), configure UE for MBS QoS flow reception at access stratum (AS) layer, control switching between PTM and PTP delivery per UE, support multicast sessions continuity during Xn Handover and N2 Handover, and/or support notification of multicast session activation over radio toward UEs in CM-IDLE state and CM-CONNECTED with a radio resource control (RRC) Inactive state, among other examples.

The UE may also perform functions to support MBS. For example, the UE may receive multicast data using PTM/PTP, receive broadcast data using PTM, handle incoming MBS QoS flows, support, signaling for joining and leaving multicast MBS session, provide MBS resource management support at AS layer, and/or receive notification in CM-IDLE state and CM-CONNECTED with RRC Inactive state for multicast data transmission, among other examples.

The AF may also perform functions to support MBS. For example, the AF may requesting multicast or broadcast service from the 5GC by providing service information including QoS requirement to 5GC, instruct MBS session operation towards 5GC if needed, and/or interact with NEF for MBS related service exposure, among other examples.

The NEF may also perform functions to support MBS. For example, the NEF may provide an interface to AFs for MBS procedures including service provisioning, MBS session and QoS management, interact with AF and NFs in 5GC, (e.g., MB-SMF for MBS session operations), determine transport parameters, and/or select MB-SMF to serve an MBS Session.

The MBSF may also perform functions to support MBS. For example, the MBSF may provide service level functionality to support MBS and interworking with LTE MBMS, interact with AF and MB-SMF for MBS session operations, determine transport parameters, determine session transport, select MB-SMF to serve an MBS session, control Multicast/Broadcast Service Transport Function (MBSTF) if the MBSTF is used, and/or determine sender internet protocol (IP) multicast address for the MBS session if IP multicast address is sourced by MBSTF, among other examples. In some networks, MBSF functionality related to service and MBS data handling (e.g. encoding) is to be determined with SA WG4.

The MBSTF may also perform functions to support MBS. For example, the MBSTF may provide a media anchor for MBS data traffic if needed, source IP multicast if needed, provide generic packet transport functionalities available to any IP multicast enabled application such as framing, multiple flows, packet FEC (encoding), and/or provide multicast/broadcast delivery of input files as objects or object flows, among other examples. In some networks, MBSTF functionality related to MBS data handling (e.g. encoding) is to be determined with SA WG4.

The UDM may also perform functions to support MBS. For example, the UDM may support management of subscription for authorization for multicast MBS sessions.

The UDR may also perform functions to support MBS. For example, the UDR may support management of UE authorization information for multicast MBS session and/or support management of policy information for multicast or broadcast MBS session, among other examples.

The NRF may also perform functions to support MBS. For example, the NRF may support new NF types MB-SMF and MBSF and corresponding NF profiles, support (e.g., for multicast and/or broadcast MBS sessions) MB-SMF discovery based on parameters such as DNN, S-NSSAI and MB service area, at MBS Session creation, and/or support (e.g., for multicast MBS sessions) MB-SMF discovery based on MBS Session identifier (ID) by SMF serving the multicast Session at UE join, among other examples.

An NF profile in the NRF may include, for MB-SMF, MBS Session ID(s), Area Session ID(s) and corresponding MBS service area(s) if available.

A 5G system architecture for MBS reuses existing reference points of N1, N2, N4, N10, N11, N30 and N33 with enhancement to support MBS.

As indicated above, FIG. 4 is provided as an example. Other examples may differ from what is described with regard to FIG. 4.

In some networks, as described herein, a UE attempting to receive an MBMS may receive one or more keys from a MB-SC using a broadcast or multicast communication on a user plane. For example, the UE may receive an MSK via a PTP communication and then receive an MTK via a PTM communication. The UE may decrypt the MSK using a MUK and then may decrypt the MTK using the MSK. Although the use of these keys provides security and reduces unauthorized access to MBMS data, a UE attempting to establish the MBMS may observe latency based at least in part on timing of reception of the MTK and the MSK and may consume computing resources used for decryption and/or generation of the different keys.

In some aspects described herein, an MBSF may derive and/or generate an MSK and distribute the MSK to the UE using a control plane-based communication. For example, the MBSF may transmit the MSK to the UE via one or more cellular network devices and may transmit the MSK to one or more network entities, such as a BM-SC or MBSTF (e.g., which may co-exist with the BM-SC and/or may have a subset of BM-SC functionalities). In this way, the UE may receive the MSK with reduced latency and/or the MSK may not be encrypted with an MUK or other key based at least in part on reliance on security already established on the control plane. In this way, the UE may improve latency and/or reduce consumption of computing resources to establish a secure connection for receiving the MBMS.

In some aspects, an MBSTF includes a key distribution function and session and transmission function of the BM-SC. The MSK generation at the MB-SC may be replaced with a key supplied by the MBSF. Additionally, or alternatively, a procedure for the BM-SC to generate and provide the MSK may not be required. In some aspects, the UE receives the MSK during an MBS session join procedure using, for example, a non-access stratum (NAS) message.

In some aspects, MTK delivery and MBS traffic processing may be provided via the MB-SC as described in connection with FIG. 3. Alternatively, the MTK may be transmitted to the UE along with MSK via the control plane. This may enable the UE to process MBS traffic immediately upon joining the MBMS rather than waiting to receive the MTK which is sent in a PTM (or multicast/broadcast) message and protected using the MSK.

In some aspects, when a new MTK is generated by MBSTF, the MTK is provided to the MBSF. Additionally, or alternatively, the MBSF may generate the MTK and supply the MTK to the MBSTF. In some aspects, MTK generation may be periodic or triggered (requested) by the MBSTF. In some aspects, an MTK change may be indicated to the UE via NAS so that the UE may request an updated MTK. In some aspects, the UE may request the MTK using a NAS procedure (e.g., a new key request or an existing PDU session modification procedure). In some aspects, the MB-SMF may push the MTK to UEs that have joined the MBS session along with the indication.

Figure 5:
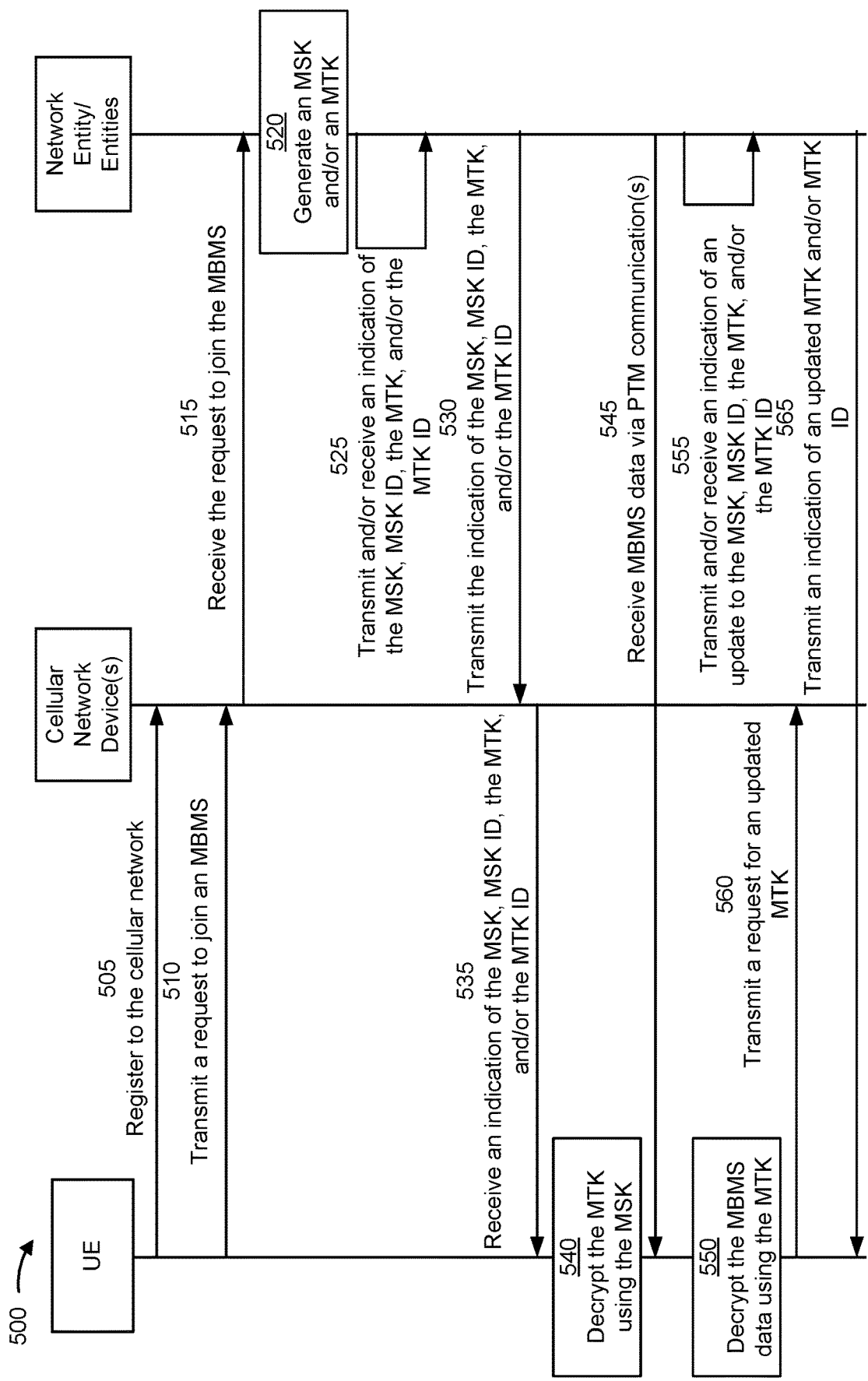
FIGS. 5 and 6 are diagrams illustrating examples associated with control plane-based communication of MSKs, in accordance with the present disclosure.

FIG. 5 is a diagram illustrating an example 500 associated with control plane-based communication of MSKs, in accordance with the present disclosure. As shown in FIG. 5, a UE (e.g., UE 120) may communication with one or more cellular network devices (e.g., base station 110, an AMF, an SMF, an MB-SMF, among other examples) and/or one or more network entities. In some aspects, the one or more cellular network devices and the UE may be part of a wireless network (e.g., wireless network 100). The UE and the one or more cellular network devices may have established a wireless connection prior to operations shown in FIG. 5.

As shown by reference number 505, the UE may register to a cellular network provided by the one or more cellular network devices. In some aspects, the cellular network is associated with an MBMS.

As shown by reference number 510, the UE may transmit a request to join an MBMS after registering to the cellular network. In some aspects, the UE may transmit the request to join the MBMS via a control plane signaling message (e.g., a control plane communication). In some aspects, the UE control plane signaling message may include an uplink NAS message. In some aspects, the UE may transmit the request to join the MBMS based at least in part on an advertisement received via the cellular network and/or via the one or more network entities.

As shown by reference number 515, the one or more network entities may receive, and the one or more cellular network devices may transmit, the request to join the MBMS initiated by the UE.

As shown by reference number 520, the one or more network entities may generate an MSK and/or an MTK. In some aspects, a MBSF generates the MSK and/or the MTK. For example, the MBSF may generate both of the MSK and the MTK, or the MBSF may generate the MSK and may receive the MTK from an additional network entity (e.g., a MB-SC and/or MBSTF).

In some aspects, the one or more entities (e.g., the MBSF) may generate the MSK based at least in part on a change of multicast/broadcast membership, a periodicity for updating the MSK, and/or detection of a security event (e.g., a determination that the MSK is compromised) associated with the MSK, among other examples.

As shown by reference number 525, a first network entity of the one or more network entities may transmit, and a second network entity of the one or more network entities may receive, an indication of the MSK, the MSK identifier (ID), the MTK, and/or an MTK identifier. The MSK and the MSK identifier may form an MSK-MSK identifier pair. For example, the MSK may be associated with a unique MSK identifier that is provided with the MSK.

In some aspects, the first network entity may transmit an indication of multiple MSKs (e.g., simultaneously and/or in a same message). In some aspects, a first MSK may be valid for a first time period and a second MSK may be valid for a second time period. In some aspects, a first MSK may be used to encrypt a second MSK and/or a third MSK, among other examples. In some aspects, a first MSK may be valid for a first service and a second MSK may be valid for a second service.

In some aspects, the MTK may be associated with an MTK identifier (e.g., as an MTK-MTK identifier pair) to indicate that the MTK may be used with the MSK. For example, the MTK identifier may match the MSK identifier of the MSK or may otherwise indicated compatibility of the MTK with the MSK.

In some aspects, the MBSF may generate the MSK and provide the MSK to an BM-SC, an MBSTF, and/or a key distribution entity, among other examples. In some aspects, the MBSF may also generate the MTK and provide the MTK to the MBSTF. Alternatively, the MBSTF may generate the MTK based at least in part on the MSK and may provide the MTK to the MBSF.

As shown by reference number 530, the one or more network entities may transmit the indication of the MSK, the MSK identifier, the MTK, and/or the MTK identifier to the one or more cellular network devices.

In some aspects, the one or more network entities may transmit an indication of multiple MSKs (e.g., simultaneously and/or in a same message). In some aspects, a first MSK may be valid for a first time period and a second MSK may be valid for a second time period. In some aspects, a first MSK may be used to encrypt a second MSK and/or a third MSK, among other examples. In some aspects, a first MSK may be valid for a first service and a second MSK may be valid for a second service.

As shown by reference number 535, the UE may receive, and the one or more cellular network devices may transmit, the indication of the MSK, the MSK identifier, the MTK, and/or the MTK identifier. In some aspects, the UE may receive the indication of the MSK, the MSK identifier, the MTK, and/or the MTK identifier via a response from the cellular network that is based at least in part on the UE being registered to the cellular network. For example, the one or more cellular network devices may rely on security of the control plane to provide the indication of the MSK, the MSK identifier, the MTK, and/or the MTK identifier.

In some aspects, the UE may receive, and the one or more cellular network devices may transmit, the indication of the MSK and/or MSK identifier in a separate transmission from the indication of the MTK and/or the MTK identifier. In some aspects, the UE may receive a first MTK with the MSK and may receive (e.g., via the control plan or the user plane) a second MTK after receiving the MSK. For an MTK that is received via the user plane, the MTK may be encrypted using the MSK.

In some aspects, the UE may receive the MSK via the control plane (e.g., a control plane signaling message) of the cellular network based at least in part on transmission from a network entity (e.g., an MBSF) to one or more of the cellular network devices. In some aspects, the control plane signaling message includes a downlink NAS message.

In some aspects, the one or more network devices may include a multicast/broadcast session management function, a session management function, and/or an access and mobility management function, among other examples. For example, the UE may receive the MSK from the MBSF via the control plane of the cellular network based at least in part on, for example, receiving the MSK via the multicast/broadcast session management function, the session management function, and/or the access and mobility management function.

In some aspects, the response may include an indication of a validity of the MSK, an MTK associated with the MSK, an MTK identifier associated with the MTK, and/or an indication of a validity of the MTK. In some aspects, the response may indicate that the MSK is used to protect (e.g., encrypt) multiple MTKs, where multiple MTKs are used at different time intervals.

In an example application of the MSK and multiple associated MTKs, the MSK may be indicated as valid for a day and MTKs may be indicated or configured to be valid for an hour. At a first time, the MSK is used to protect MTK1 which is broadcast over a user plane. At a second time, the MSK is used to protect MTK2 and at a third time, the MSK is used to protect MTK3. In the described control plane-based indication, when the UE receives the MSK from the network, the UE may also receive a current (e.g., currently valid) MTK along with the MSK. For example, if the UE joins the MBMS service between t2 and t3, the UE may receive the MSK and MTK2 over the control-plane.

In some aspects, the UE may receive the MSK via the control plane and may receive the MTK via a PTP communication from the one or more network entities.

In some aspects, the US may receive an indication of multiple MSKs (e.g., simultaneously and/or in a same message). In some aspects, a first MSK may be valid for a first time period and a second MSK may be valid for a second time period. In some aspects, a first MSK may be used to encrypt a second MSK and/or a third MSK, among other examples. In some aspects, a first MSK may be valid for a first service and a second MSK may be valid for a second service. In some aspects, the UE may receive (e.g., in a same message) an indication of how to use the multiple MSKs (e.g., as described herein).

As shown by reference number 540, the UE may decrypt the MTK using the MSK. In some aspects, the UE may decrypt the MTK using the MSK based at least in part on receiving the MSK via the control plane and receiving the MTK via the user plane. In some aspects, the MTK may be encrypted using the MSK based at least in part the MTK being transmitted to the UE via the user plane.

As shown by reference number 545, the UE may receive, and the one or more network entities may transmit, MBMS data via one or more PTM communications.

As shown by reference number 550, the UE may decrypt the MBMS data based at least in part on the MTK.

As shown by reference number 555, the first network entity of the one or more network entities may transmit, and the second network entity of the one or more network entities may receive, an indication of an update to the MSK, the MSK identifier, the MTK, and/or the MSK identifier. In some aspects, the first network entity (e.g., the MBSF) may generate an updated MTK and provide the updated MTK to the second network entity (the MBSTF or BM-SC) and to the UE (to the UE using the control plane). In some aspects, the first network entity (e.g., the MBSF) may receive an updated MTK generated by the second network entity (the MBSTF or BM-SC) and transmit the updated MTK to the UE (to the UE using the control plane). In some aspects, the first network entity may use the updated MTK and/or an associated MTK identifier to confirm validity of an active MSK.

In some aspects, the first network entity may transmit the MTK based at least in part on receiving, from the second network entity, a request for the MTK, or a periodicity for updating the MTK.

As shown by reference number 560, the UE may transmit, and the one or more cellular network devices may receive, a request for an updated MTK. In some aspects, the UE may transmit the request for the updated MTK based at least in part on receiving an indication that the MTK is updated (e.g., in an updated MTK message). In some aspects, the UE may transmit the request via the control plane. In some aspects, the UE may receive a response from the one or more network entities (e.g., the MBSF) via the one or more cellular network devices. In some aspects, the UE response may indicate the updated MTK based at least in part on, for example, the UE failing to receive the updated MTK via a PTP or PTM communication from the one or more network entities (e.g., the MBSTF or BM-SC).

As shown by reference number 565, the one or more network entities may transmit, and the UE may receive, an indication of an updated MTK and/or MTK identifier. In some aspects, the UE may receive the updated MTK message via a PTM communication.

In some aspects, a first network entity may transmit the updated MTK based at least in part on receiving an indication, from a second network entity, to update the MTK.

Additionally, or alternatively, the one or more network entities may transmit an updated MSK to the UE. For example, the one or more network entities may transmit the updated MSK based at least in part on receiving an indication to update the MSK from another of the one or more network entities.

Based at least in part on the UE receiving the MSK and/or the MTK via a control plane communication, the UE may receive the MSK with reduced latency and/or the MSK may not be encrypted with an MUK or other key based at least in part on reliance on security already established on the control plane. In this way, the UE may improve latency and/or reduce consumption of computing resources to establish a secure connection for receiving the MBMS.

As indicated above, FIG. 5 is provided as an example. Other examples may differ from what is described with regard to FIG. 5.

Figure 6:
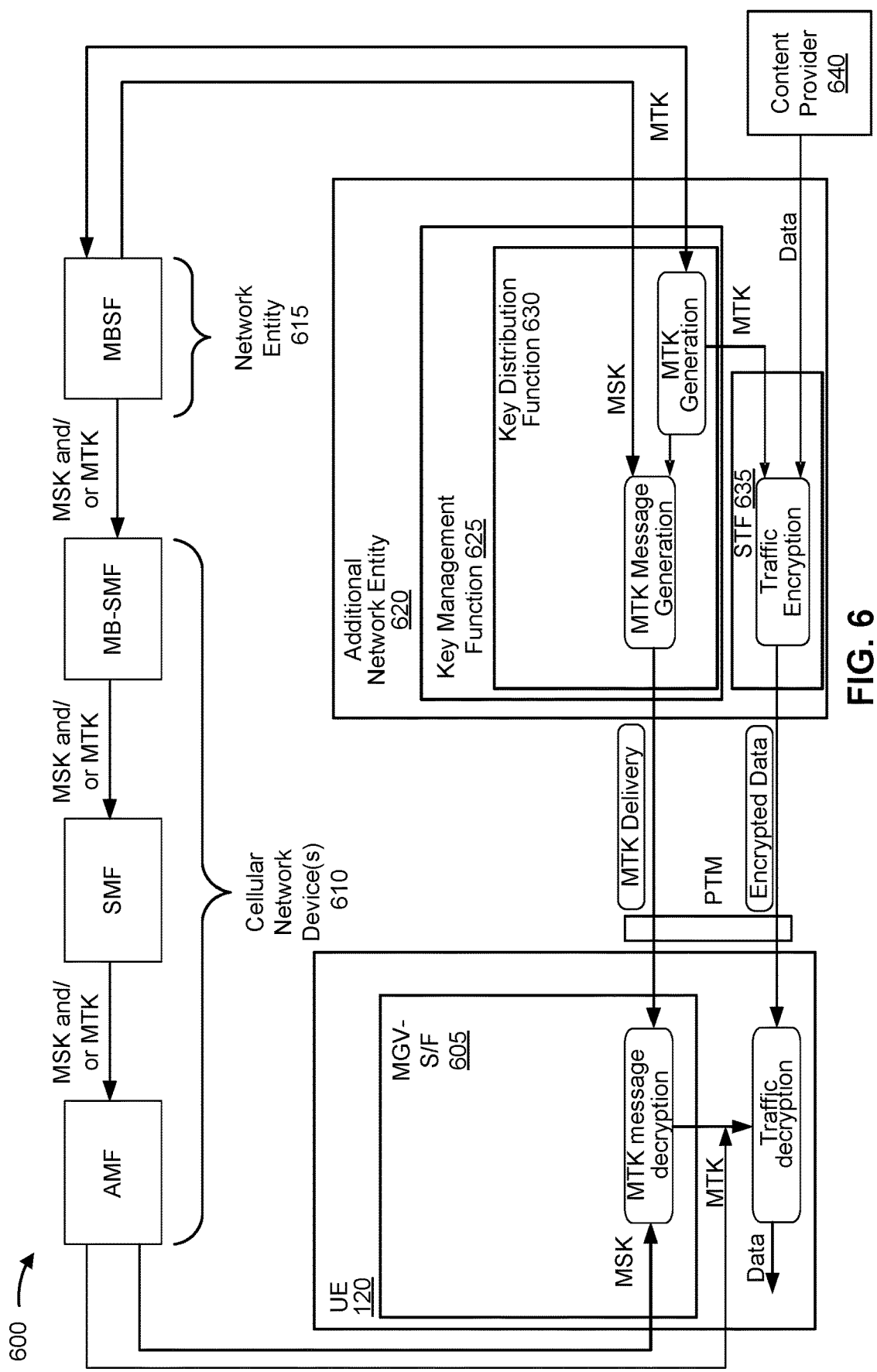

FIG. 6 is a diagram illustrating an example 600 associated with control plane-based communication of MSKs, in accordance with the present disclosure. As shown in FIG. 6, a UE 120 may communication with one or more cellular network devices 610 (e.g., base station 110, an AMF, an SMF, an MB-SMF, among other examples), a network entity 615 (e.g., an MBSF) and an additional network entity 620 (e.g., an MBSTF and/or a BM-SC). In some aspects, the one or more cellular network devices 610 and the UE may be part of a wireless network (e.g., wireless network 100). The UE and the one or more cellular network devices may have established a wireless connection prior to operations shown in FIG. 6.

As shown in FIG. 6, and in contrast to FIG. 3, the UE may receive an MSK and/or an MTK from the network entity 615 via the one or more cellular network devices 610. As shown the MBSF may transmit the MSK through the one or more cellular network devices 610 to the UE and may transmit the MSK to the additional network entity 620, the key management function 625, and/or the key distribution function 630.

The UE may manage and/or validate keys, such as the MSK and/or MTK, using an MBMS key generation and validation function/storage (MGV-S/F) 605.

In some aspects, the additional network entity 620, the key management function 625, and/or the key distribution function 630 may use the MSK to generate an MTK. The additional network entity 620, the key management function 625, and/or the key distribution function 630 may transmit the MTK (e.g., with an MTK identifier for validation of the MSK) to the UE via the user plane and/or may provide the MTK (e.g., with an MSK identifier for validation of the MSK) to the network entity 615 to confirm validity of the MSK. In some aspects, if the MTK confirms invalidity of the MSK, the network entity 615 may transmit the MSK to the additional network entity 620 and/or may update the MSK.

In some aspects, the network entity 615 may generate the MTK and may provide the MTK to the additional network entity 620, the key management function 625, and/or the key distribution function 630 to be used for encoding data associated with the network entity 615. The network entity 615 may also provide the MTK to the UE via the one or more cellular network devices 610.

In some aspects, the MBSF may transmit a first MTK (e.g., a current MTK when the UE 120 joins the MBMS) via the control plane and the BM-SC 620 may transmit a second MTK via the user plane (e.g., using a PTM communication).

The additional network entity 620 may use the MTK, at the Session and Transmission function 635, to encrypt data received from a content provider 640. The additional network entity 620 may transmit traffic as encrypted data to the UE 120 for decryption using the MTK at the UE 120.

As indicated above, FIG. 6 is provided as an example. Other examples may differ from what is described with regard to FIG. 6.

Figure 7:
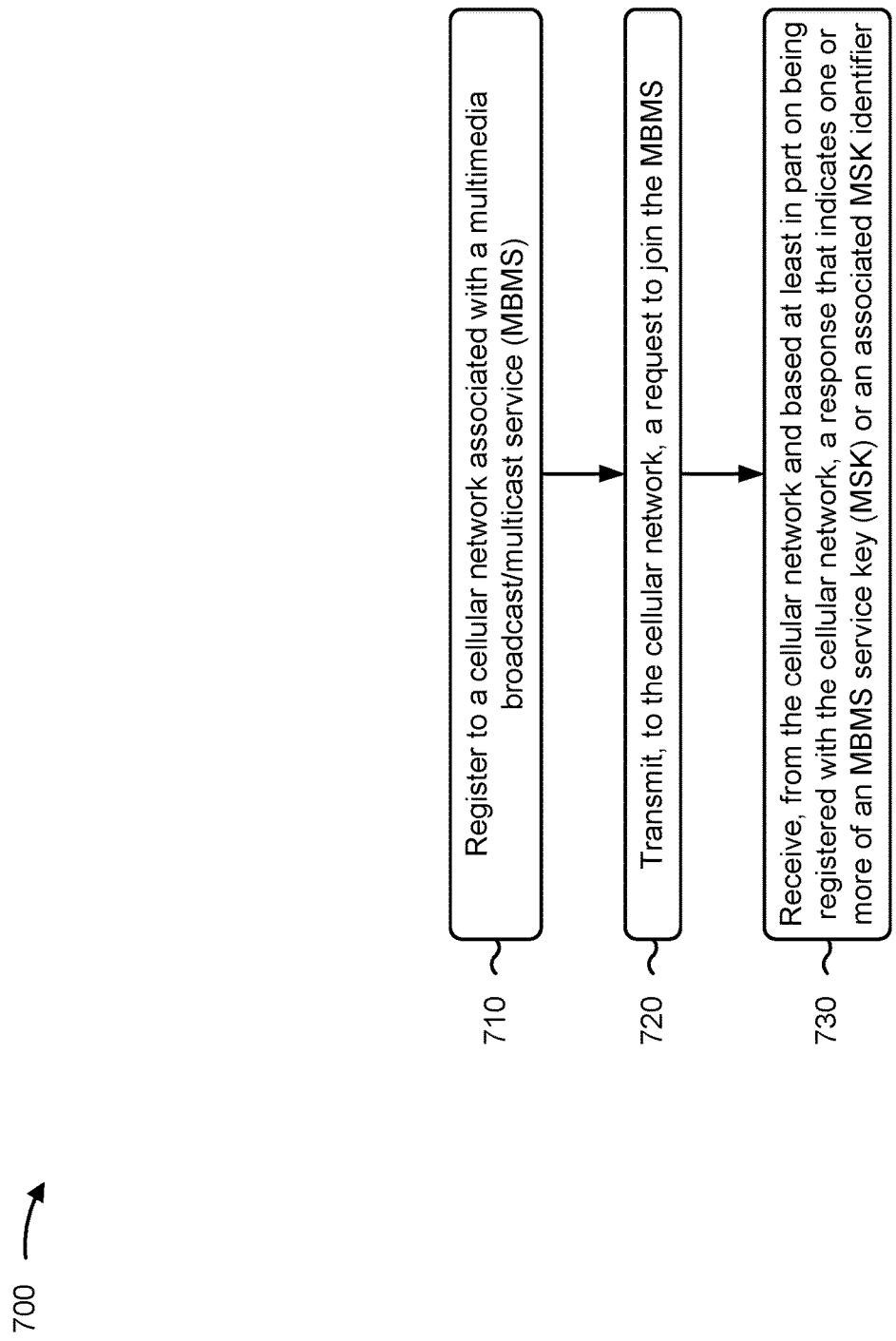
FIGS. 7 and 8 are diagrams illustrating example processes associated with control plane-based communication of MSKs, in accordance with the present disclosure.

FIG. 7 is a diagram illustrating an example process 700 performed, for example, by a UE, in accordance with the present disclosure. Example process 700 is an example where the UE (e.g., UE 120) performs operations associated with control plane-based communication of MSKs.

As shown in FIG. 7, in some aspects, process 700 may include registering to a cellular network associated with an MBMS transmitting, to the cellular network, a request to join the MBMS (block 710). For example, the UE (e.g., using communication manager 140 and/or communication manager 908, depicted in FIG. 9) may register to a cellular network associated with an MBMS transmitting, to the cellular network, a request to join the MBMS, as described above.

As shown in FIG. 7, in some aspects, process 700 may include transmitting, to the cellular network, a request to join the MBMS (block 720). For example, the UE (e.g., using communication manager 140 and/or transmission component 904, depicted in FIG. 9) may transmit, to the cellular network, a request to join the MBMS, as described above.

As further shown in FIG. 7, in some aspects, process 700 may include receiving, from the cellular network and based at least in part on being registered with the cellular network, a response that indicates an MSK and MSK identifier pair (block 720). For example, the UE (e.g., using communication manager 140 and/or reception component 902, depicted in FIG. 9) may receive, from the cellular network and based at least in part on being registered with the cellular network, a response that indicates an MSK and MSK identifier pair, as described above.

Process 700 may include additional aspects, such as any single aspect or any combination of aspects described below and/or in connection with one or more other processes described elsewhere herein.

In a first aspect, the response comprises one or more of an indication of a validity of the MSK, an MTK associated with the MSK, an MTK identifier associated with the MTK, or an indication of a validity of the MTK.

In a second aspect, alone or in combination with the first aspect, receiving the MTK message comprises one or more of receiving the MTK message via the control plane of the cellular network, or receiving the MTK message via a point-to-multipoint communication.

In a third aspect, alone or in combination with one or more of the first and second aspects, process 700 includes receiving, after receiving the MTK message via the control plane of the cellular network, an updated MTK message via the point-to-multipoint communication.

In a fourth aspect, alone or in combination with one or more of the first through third aspects, the MTK is encrypted based at least in part on the MSK.

In a fifth aspect, alone or in combination with one or more of the first through fourth aspects, process 700 includes decrypting the MTK based at least in part on the MSK.

In a sixth aspect, alone or in combination with one or more of the first through fifth aspects, process 700 includes receiving MBMS data via a point-to-multipoint communication and decrypting the MBMS data based at least in part on the MTK.

In a seventh aspect, alone or in combination with one or more of the first through sixth aspects, process 700 includes receiving, via a point-to-multipoint communication, an indication of an update to the MTK.

In an eighth aspect, alone or in combination with one or more of the first through seventh aspects, process 700 includes transmitting, to the cellular network, a request for an updated MTK based at least in part on receiving the indication of the update to the MTK and receiving the updated MTK via the control plane of the cellular network.

In a ninth aspect, alone or in combination with one or more of the first through eighth aspects, receiving the response comprises receiving the response via a control plane of the cellular network and via one or more of: a multicast/broadcast session management function, a session management function, or an access and mobility management function.

In a tenth aspect, alone or in combination with one or more of the first through ninth aspects, transmitting the request to join the MBMS comprises transmitting the request to join the MBMS via a control plane signaling message.

In an eleventh aspect, alone or in combination with one or more of the first through tenth aspects, the control plane signaling message comprises an uplink NAS message.

In a twelfth aspect, alone or in combination with one or more of the first through eleventh aspects, receiving the response comprises receiving the response via a control plane signaling message.

In a thirteenth aspect, alone or in combination with one or more of the first through twelfth aspects, the control plane signaling message comprises a downlink NAS message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
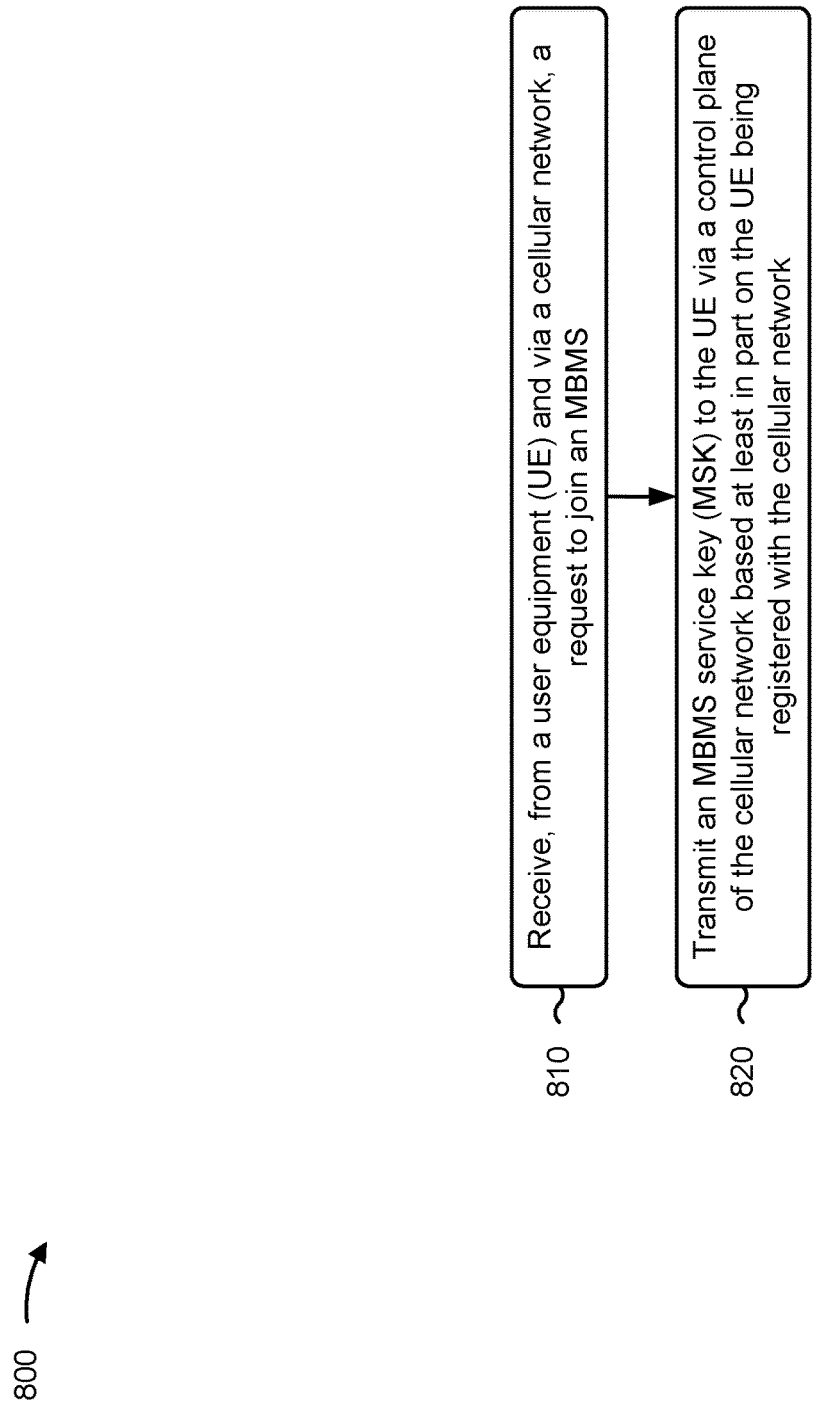

FIG. 8 is a diagram illustrating an example process 800 performed, for example, by a network entity, in accordance with the present disclosure. Example process 800 is an example where the network entity (e.g., device 1000) performs operations associated with control plane-based communication of MSKs.

As shown in FIG. 8, in some aspects, process 800 may include receiving, from a UE and via a cellular network, a request to join the MBMS (block 810). For example, the network entity (e.g., using communication component 1060, depicted in FIG. 10) may receive, from a UE and via a cellular network, a request to join the MBMS, as described above.

As further shown in FIG. 8, in some aspects, process 800 may include transmitting a MSK to the UE via a control plane of the cellular network based at least in part on the UE being registered with the cellular network (block 820). For example, the network entity (e.g., using communication component 1060) may transmit a MSK to the UE via a control plane of the cellular network based at least in part on the UE being registered with the cellular network, as described above.

Process 800 may include additional aspects, such as any single aspect or any combination of aspects described below and/or in connection with one or more other processes described elsewhere herein.

In a first aspect, process 800 includes generating the MSK before transmitting the MSK.

In a second aspect, alone or in combination with the first aspect, generating the MSK before transmitting the MSK comprises generating the MSK based at least in part on one or more of a change of multicast/broadcast membership, a periodicity for updating the MSK, detecting a security event associated with the MSK.

In a third aspect, alone or in combination with one or more of the first and second aspects, the network entity comprises a MBSF.

In a fourth aspect, alone or in combination with one or more of the first through third aspects, process 800 includes receiving, from an additional network entity, an MTK that is associated with the MSK.

In a fifth aspect, alone or in combination with one or more of the first through fourth aspects, process 800 includes transmitting an MTK to an additional network entity.

In a sixth aspect, alone or in combination with one or more of the first through fifth aspects, transmitting the MTK to the additional network entity comprises transmitting the MTK to the additional network entity based at least in part on one or more of receiving, from the additional network entity, a request for the MTK, or a periodicity for updating the MTK.

In a seventh aspect, alone or in combination with one or more of the first through sixth aspects, process 800 includes generating the MTK before transmitting the MTK.

In an eighth aspect, alone or in combination with one or more of the first through seventh aspects, the additional network entity comprises one or more of a BM-SC, an MBSTF or a key distribution entity.

In a ninth aspect, alone or in combination with one or more of the first through eighth aspects, process 800 includes transmitting, to the UE, an MTK message via the control plane of the cellular network.

In a tenth aspect, alone or in combination with one or more of the first through ninth aspects, the MTK is encrypted based at least in part on the MSK.

In an eleventh aspect, alone or in combination with one or more of the first through tenth aspects, process 800 includes receiving, from an additional network entity, an updated MTK, transmitting, to the UE, the updated MTK via the control plane of the cellular network, or a combination thereof.

In a twelfth aspect, alone or in combination with one or more of the first through eleventh aspects, process 800 includes transmitting, to an additional network entity, the updated MTK.

In a thirteenth aspect, alone or in combination with one or more of the first through twelfth aspects, process 800 includes transmitting, to the UE, the updated MTK via the control plane of the cellular network.

In a fourteenth aspect, alone or in combination with one or more of the first through thirteenth aspects, transmitting the updated MTK via the control plane of the cellular network comprises transmitting the updated MTK based at least in part on reception of a request from the UE, or transmitting the updated MTK to the UE based at least in part on the UE joining the MBMS.

In a fifteenth aspect, alone or in combination with one or more of the first through fourteenth aspects, process 800 includes receiving, from an additional network entity, an indication to update the MSK, and transmitting, to the additional network entity, an updated MSK.

In a sixteenth aspect, alone or in combination with one or more of the first through fifteenth aspects, process 800 includes transmitting, to the UE, the updated MSK.

In a seventeenth aspect, alone or in combination with one or more of the first through sixteenth aspects, transmitting the MSK to the UE via the control plane of the cellular network comprises transmitting the MSK via one or more of a multicast/broadcast session management function, a session management function, or an access and mobility management function.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
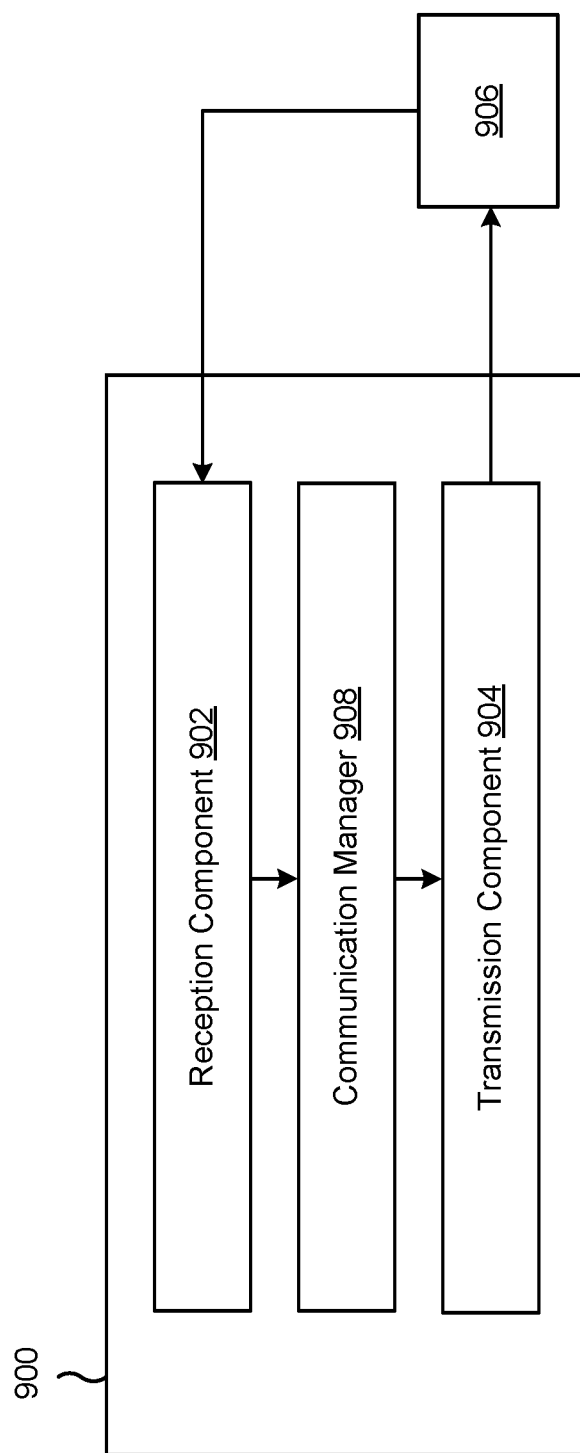
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., the communication manager 140).

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 908 may register to a cellular network associated with an MBMS. The transmission component 904 may transmit, to the cellular network, a request to join the MBMS. The reception component 902 may receive, from the cellular network and based at least in part on being registered with the cellular network, a response that indicates an MBMS service key (MSK) and MSK identifier pair.

The reception component 902 may receive, after receiving the response via the control plane of the cellular network, an updated response via the point-to-multipoint communication.

The communication manager 908 and/or the reception component 902 may decrypt the MBMS traffic key based at least in part on the MSK.

The reception component 902 may receive MBMS data via a point-to-multipoint communication.

The communication manager 908 and/or the reception component 902 may decrypt the MBMS data based at least in part on the MBMS traffic key.

The reception component 902 may receive, via a point-to-multipoint communication, an indication of an update to the MBMS traffic key.

The transmission component 904 may transmit, to the cellular network, a request for an updated MBMS traffic key based at least in part on receiving the indication of the update to the MBMS traffic key.

The reception component 902 may receive the updated MBMS traffic key via the control plane of the cellular network.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
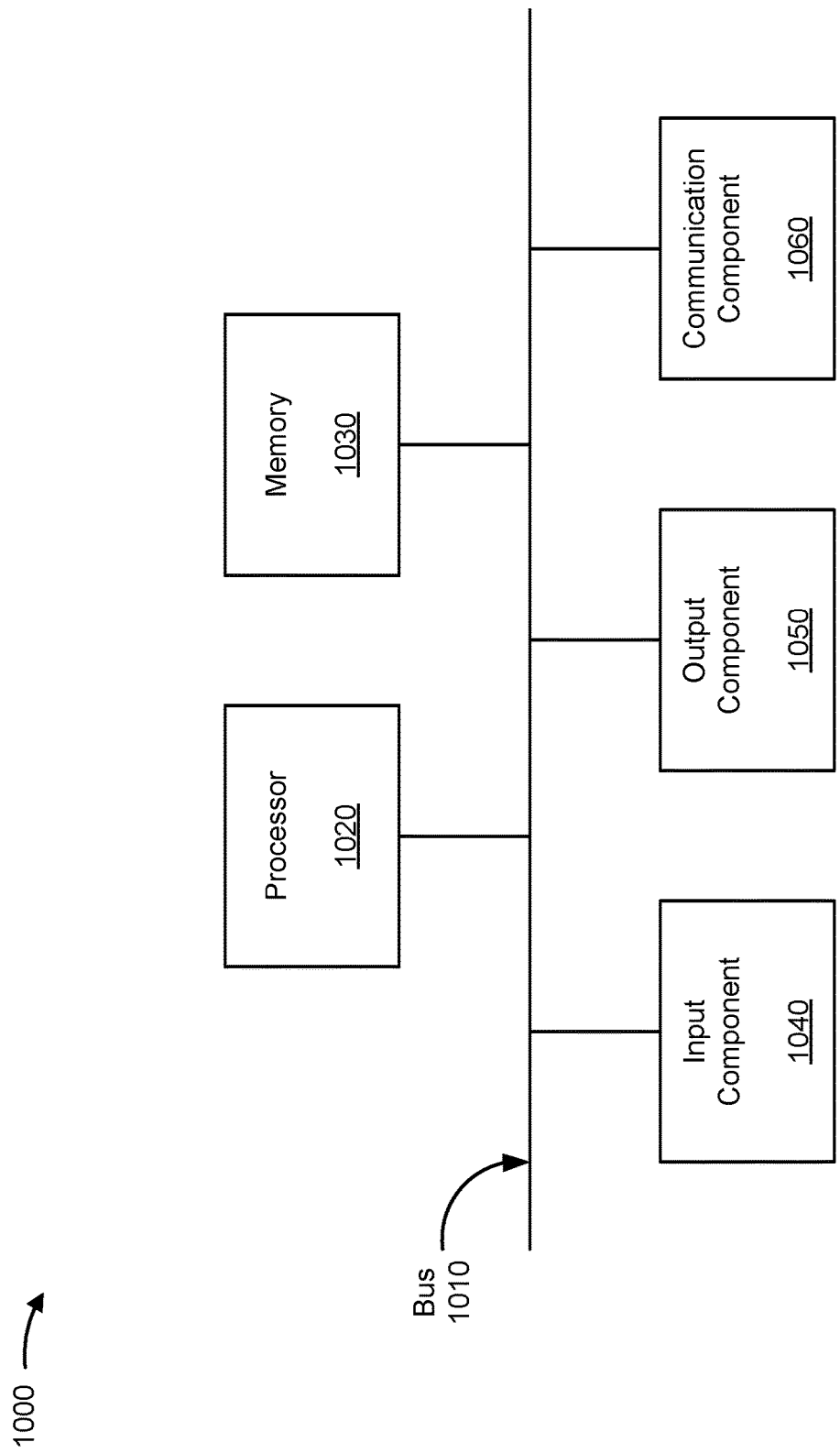
FIG. 10 is a diagram of example components of a device, in accordance with the present disclosure.

FIG. 10 is a diagram of example components of a device 1000, which may correspond to the network entity 615 (e.g., the MBSF), one or more of the one or more cellular network devices 610, the BM-SC 620, the key management function 625, and/or the key distribution function 630. In some implementations, the network entity 615 (e.g., the MBSF), one or more of the one or more cellular network devices 610, the BM-SC 620, the key management function 625, and/or the key distribution function 630 include one or more devices 1000 and/or one or more components of device 1000. As shown in FIG. 10, device 1000 may include a bus 1010, a processor 1020, a memory 1030, an input component 1040, an output component 1050, and a communication component 1060.

Bus 1010 includes one or more components that enable wired and/or wireless communication among the components of device 1000. Bus 1010 may couple together two or more components of FIG. 10, such as via operative coupling, communicative coupling, electronic coupling, and/or electric coupling. Processor 1020 includes a central processing unit, a graphics processing unit, a microprocessor, a controller, a microcontroller, a digital signal processor, a field-programmable gate array, an application-specific integrated circuit, and/or another type of processing component. Processor 1020 is implemented in hardware, firmware, or a combination of hardware and software. In some implementations, processor 1020 includes one or more processors capable of being programmed to perform one or more operations or processes described elsewhere herein.

Memory 1030 includes volatile and/or nonvolatile memory. For example, memory 1030 may include random access memory (RAM), read only memory (ROM), a hard disk drive, and/or another type of memory (e.g., a flash memory, a magnetic memory, and/or an optical memory). Memory 1030 may include internal memory (e.g., RAM, ROM, or a hard disk drive) and/or removable memory (e.g., removable via a universal serial bus connection). Memory 1030 may be a non-transitory computer-readable medium. Memory 1030 stores information, instructions, and/or software (e.g., one or more software applications) related to the operation of device 1000. In some implementations, memory 1030 includes one or more memories that are coupled to one or more processors (e.g., processor 1020), such as via bus 1010.

Input component 1040 enables device 1000 to receive input, such as user input and/or sensed input. For example, input component 1040 may include a touch screen, a keyboard, a keypad, a mouse, a button, a microphone, a switch, a sensor, a global positioning system sensor, an accelerometer, a gyroscope, and/or an actuator. Output component 1050 enables device 1000 to provide output, such as via a display, a speaker, and/or a light-emitting diode. Communication component 1060 enables device 1000 to communicate with other devices via a wired connection and/or a wireless connection. For example, communication component 1060 may include a receiver, a transmitter, a transceiver, a modem, a network interface card, and/or an antenna.

Device 1000 may perform one or more operations or processes described herein. For example, a non-transitory computer-readable medium (e.g., memory 1030) may store a set of instructions (e.g., one or more instructions or code) for execution by processor 1020. Processor 1020 may execute the set of instructions to perform one or more operations or processes described herein. In some implementations, execution of the set of instructions, by one or more processors 1020, causes the one or more processors 1020 and/or the device 1000 to perform one or more operations or processes described herein. In some implementations, hardwired circuitry is used instead of or in combination with the instructions to perform one or more operations or processes described herein. Additionally, or alternatively, processor 1020 may be configured to perform one or more operations or processes described herein. Thus, implementations described herein are not limited to any specific combination of hardware circuitry and software.

The number and arrangement of components shown in FIG. 10 are provided as an example. Device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

The following provides an overview of some Aspects of the present disclosure:

Aspect 1: A method of wireless communication performed by a user equipment (UE), comprising: registering to a cellular network associated with a multimedia broadcast/multicast service (MBMS); transmitting, to the cellular network, a request to join the MBMS; and receiving, from the cellular network and based at least in part on being registered with the cellular network, a response that indicates an MBMS service key (MSK) and MSK identifier pair.

Aspect 2: The method of Aspect 1, wherein the response comprises one or more of: an indication of a validity of the MSK, an MBMS traffic key (MTK) associated with the MSK, an MTK identifier associated with the MTK, or an indication of a validity of the MBMS traffic key.

Aspect 3: The method of Aspect 2, wherein receiving the response comprises one or more of: receiving the response via the control plane of the cellular network, or receiving the response via a point-to-multipoint communication.

Aspect 4: The method of Aspect 3, further comprising: receiving, after receiving the response via the control plane of the cellular network, an updated response via the point-to-multipoint communication.

Aspect 5: The method of Aspect 2, wherein the MBMS traffic key is encrypted based at least in part on the MSK.

Aspect 6: The method of any of Aspects 2-5, further comprising: decrypting the MBMS traffic key based at least in part on the MSK.

Aspect 7: The method of any of Aspects 2-6, further comprising: receiving MBMS data via a point-to-multipoint communication; and decrypting the MBMS data based at least in part on the MBMS traffic key.

Aspect 8: The method of any of Aspects 2-7, further comprising: receiving, via a point-to-multipoint communication, an indication of an update to the MBMS traffic key.

Aspect 9: The method of Aspect 8, further comprising: transmitting, to the cellular network, a request for an updated MBMS traffic key based at least in part on receiving the indication of the update to the MBMS traffic key; and receiving the updated MBMS traffic key via the control plane of the cellular network.

Aspect 10: The method of any of Aspects 1-9, wherein receiving the MSK from the MBSF via the control plane of the cellular network comprises receiving the response comprises receiving the response via a control plane of the cellular network and via one or more of: a multicast/broadcast session management function, a session management function, or an access and mobility management function.

Aspect 11: The method of any of Aspects 1-10, wherein transmitting the request to join the MBMS comprises: transmitting the request to join the MBMS via a control plane signaling message.

Aspect 12: The method of Aspect 11, wherein the control plane signaling message comprises an uplink non-access stratum (NAS) message.

Aspect 13: The method of any of Aspects 1-12, wherein receiving the response comprises: receiving the response via a control plane signaling message.

Aspect 14: The method of Aspect 13, wherein the control plane signaling message comprises a downlink non-access stratum (NAS) message.

Aspect 15: A method of wireless communication performed by a network entity, comprising: receiving, from a user equipment (UE) and via a cellular network, a request to join the MBMS; and transmitting a multimedia broadcast/multicast service (MBMS) service key (MSK) to the UE via a control plane of the cellular network based at least in part on the UE being registered with the cellular network.

Aspect 16: The method of Aspect 15, further comprising: generating the MSK before transmitting the MSK.

Aspect 17: The method of Aspect 16, wherein generating the MSK before transmitting the MSK comprises generating the MSK based at least in part on one or more of: a change of multicast/broadcast membership, a periodicity for updating the MSK, detecting a security event associated with the MSK.

Aspect 18: The method of any of Aspects 15-17, wherein the network entity comprises a multicast/broadcast service function (MBSF).

Aspect 19: The method of any of Aspects 15-18, further comprising: receiving, from an additional network entity, an MBMS traffic key that is associated with the MSK.

Aspect 20: The method of any of Aspects 15-18, further comprising: transmitting an MBMS traffic key to an additional network entity.

Aspect 21: The method of Aspect 20, wherein transmitting the MBMS traffic key to the additional network entity comprises: transmitting the MBMS traffic key to the additional network entity based at least in part on one or more of: receiving, from the additional network entity, a request for the MBMS traffic key, or a periodicity for updating the MBMS traffic key.

Aspect 22: The method of Aspect 20, further comprising: generating the MBMS traffic key before transmitting the MBMS traffic key.

Aspect 23: The method of Aspect 20, wherein the additional network entity comprises one or more of: a broadcast/multicast service center (BM-SC), a MBSTF or a key distribution entity.

Aspect 24: The method of Aspect 15, further comprising: transmitting, to the UE, an response via the control plane of the cellular network.

Aspect 25: The method of Aspect 24, wherein the MBMS traffic key is encrypted based at least in part on the MSK.

Aspect 26: The method of any of Aspects 24-25, further comprising: receiving, from an additional network entity, an updated MBMS traffic key; and transmitting, to the UE, the updated MBMS traffic key via the control plane of the cellular network.

Aspect 27: The method of Aspect 26, further comprising: transmitting, to an additional network entity, the updated MBMS traffic key.

Aspect 28: The method of Aspect 26, further comprising: transmitting, to the UE, the updated MBMS traffic key via the control plane of the cellular network.

Aspect 29: The method of Aspect 28, wherein transmitting the updated MBMS traffic key via the control plane of the cellular network comprises: transmitting the updated MBMS traffic key based at least in part on reception of a request from the UE, or transmitting the updated MBMS traffic key to the UE based at least in part on the UE joining the MBMS.

Aspect 30: The method of any of Aspects 15-29, further comprising: receiving, from an additional network entity, an indication to update the MSK; and transmitting, to the additional network entity, an updated MSK.

Aspect 31: The method of Aspect 30, further comprising: transmitting, to the UE, the updated MSK.

Aspect 32: The method of any of Aspects 15-30, wherein transmitting the MSK to the UE via the control plane of the cellular network comprises transmitting the MSK via one or more of: a multicast/broadcast session management function, a session management function, or an access and mobility management function.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
    register to a cellular network associated with a multimedia broadcast/multicast service (MBMS);
    transmit, to the cellular network, a request to join the MBMS; and
    receive, via a control plane of the cellular network and based at least in part on being registered with the cellular network, a response that includes an MBMS service key (MSK) and MSK identifier,
    wherein the control plane, via which the response is received, is between the UE and a network entity that communicates with the UE;
    wherein the response via encrypted control plane communication, and the MSK, within the response, is unencrypted.

2. The UE of claim 1, wherein the response comprises one or more of:
    an indication of a validity of the MSK,
    an MBMS traffic key associated with the MSK,
    an MBMS traffic key identifier associated with the MBMS traffic key, or
    an indication of a validity of the MBMS traffic key.

3. The UE of claim 2, wherein the one or more processors are further configured to:
    transmit, to the cellular network, a request for an updated MBMS traffic key based at least in part on receiving an indication of an update to the MBMS traffic key; and
    receive the updated MBMS traffic key via the control plane of the cellular network.

4. The UE of claim 1, wherein the one or more processors are further configured to:
    receive, after receiving the response, an updated response via a point-to-multipoint communication.

5. The UE of claim 1, wherein the one or more processors are configured to receive the response via one or more of:
    a multicast/broadcast session management function,
    a session management function, or
    an access and mobility management function.

6. The UE of claim 1, wherein the one or more processors are configured to:
    receive the response via a control plane signaling message.

7. The UE of claim 6, wherein the control plane signaling message comprises a downlink non-access stratum (NAS) message.

8. A network entity for wireless communication, comprising:
    a memory; and
    one or more processors, coupled to the memory, configured to:
    receive, from a user equipment (UE) and via a cellular network, a request to join a multimedia broadcast/multicast service (MBMS); and
    transmit an MBMS service key (MSK) to the UE via a control plane of the cellular network based at least in part on the UE being registered with the cellular network,
    wherein the one or more processors, to transmit the MSK, are configured to transmit the MSK to the UE via the control plane;

wherein the response via encrypted control plane communication, and the MSK, within the response, is unencrypted.

9. The network entity of claim 8, wherein the one or more processors are further configured to:
generate the MSK before transmitting the MSK.

10. The network entity of claim 9, wherein the one or more processors, to generate the MSK before transmitting the MSK, are configured to generate the MSK based at least in part on one or more of:
a change of multicast/broadcast membership,
a periodicity for updating the MSK, or
detecting a security event associated with the MSK.

11. The network entity of claim 8, wherein the network entity comprises a multicast/broadcast service function (MBSF).

12. The network entity of claim 8, wherein the one or more processors are further configured to:
receive, from an additional network entity, an MBMS traffic key that is associated with the MSK.

13. The network entity of claim 8, wherein the one or more processors are further configured to:
transmit an MBMS traffic key to an additional network entity.

14. The network entity of claim 13, wherein the one or more processors, to transmit the MBMS traffic key to the additional network entity, are configured to:
transmit the MBMS traffic key to the additional network entity based at least in part on one or more of:
receiving, from the additional network entity, a request for the MBMS traffic key, or
a periodicity for updating the MBMS traffic key.

15. The network entity of claim 13, wherein the one or more processors are further configured to:
generate the MBMS traffic key before transmitting the MBMS traffic key.

16. The network entity of claim 13, wherein the additional network entity comprises one or more of:
a broadcast/multicast service center (BM-SC),
a multicast/broadcast service traffic function (MBSTF), or
a key distribution entity.

17. The network entity of claim 8, wherein the one or more processors are further configured to:
transmit, to the UE, a response via the control plane of the cellular network.

18. The network entity of claim 17, wherein the one or more processors are further configured to:
receive, from an additional network entity, an updated MBMS traffic key;
transmit, to the UE, the updated MBMS traffic key via the control plane of the cellular network; or
a combination thereof.

19. The network entity of claim 18, wherein the one or more processors are further configured to:
transmit, to an additional network entity, the updated MBMS traffic key.

20. The network entity of claim 18, wherein the one or more processors, to transmit the updated MBMS traffic key via the control plane of the cellular network, are configured to:
transmit the updated MBMS traffic key based at least in part on reception of a request from the UE, or
transmit the updated MBMS traffic key to the UE based at least in part on the UE joining the MBMS.

21. The network entity of claim 8, wherein the one or more processors are further configured to:
receive, from an additional network entity, an indication to update the MSK; and
transmit, to the additional network entity, an updated MSK.

22. The network entity of claim 21, wherein the one or more processors are further configured to:
transmit, to the UE, the updated MSK.

23. The network entity of claim 8, wherein the one or more processors, to transmit the MSK to the UE via the control plane of the cellular network, are configured to transmit the MSK via one or more of:
a multicast/broadcast session management function,
a session management function, or
an access and mobility management function.

24. A method of wireless communication performed by a user equipment (UE), comprising:
registering to a cellular network associated with a multimedia broadcast/multicast service (MBMS);
transmitting, to the cellular network, a request to join the MBMS; and
receiving, via a control plane of the cellular network and based at least in part on being registered with the cellular network, a response that includes an MBMS service key (MSK) and MSK identifier,
wherein the control plane, via which the response is received, is between the VE and a network entity that communicates with the UE;
wherein the response via encrypted control plane communication, and the MSK, within the response, is unencrypted.

25. The method of claim 24, wherein the response comprises one or more of:
an indication of a validity of the MSK,
an MBMS traffic key associated with the MSK,
an MBMS traffic key identifier associated with the MBMS traffic key, or
an indication of a validity of the MBMS traffic key.

26. A method of wireless communication performed by a network entity, comprising:
receiving, from a user equipment (UE) and via a cellular network, a request to join a multimedia broadcast/multicast service (MBMS); and
transmitting an MBMS service key (MSK) to the UE via a control plane of the cellular network based at least in part on the UE being registered with the cellular network,
wherein transmitting the MSK comprises transmitting the MSK to the UE via the control plane;
wherein the response via encrypted control plane communication, and the MSK, within the response, is unencrypted.

27. The method of claim 26, further comprising:
generating the MSK before transmitting the MSK.

28. The method of claim 27, wherein generating the MSK before transmitting the MSK comprises generating the MSK based at least in part on one or more of:
a change of multicast/broadcast membership,
a periodicity for updating the MSK, or
detecting a security event associated with the MSK.

* * * * *